(12) United States Patent
De Margerie et al.

(10) Patent No.: US 6,859,865 B2
(45) Date of Patent: Feb. 22, 2005

(54) SYSTEM AND METHOD FOR REMOVING LATENCY EFFECTS IN ACKNOWLEDGED DATA TRANSFERS

(75) Inventors: Sylvain De Margerie, Ottawa (CA); Bruno Lepine, Ottawa (CA); Donald R. Ellis, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 305 days.

(21) Appl. No.: 09/986,548

(22) Filed: Nov. 9, 2001

(65) Prior Publication Data

US 2003/0093638 A1 May 15, 2003

(51) Int. Cl.⁷ .............................................. G06F 13/00
(52) U.S. Cl. .................... 711/162; 711/112; 711/114
(58) Field of Search ................................ 711/162, 112, 711/114

(56) References Cited

U.S. PATENT DOCUMENTS

| | | | | |
|---|---|---|---|---|
| 5,446,871 A | * | 8/1995 | Shomler et al. ................. | 714/1 |
| 5,513,314 A | * | 4/1996 | Kandasamy et al. ........... | 714/6 |
| 5,574,950 A | * | 11/1996 | Hathorn et al. ................. | 710/8 |
| 5,680,580 A | * | 10/1997 | Beardsley et al. .............. | 714/6 |
| 5,889,935 A | * | 3/1999 | Ofek et al. ...................... | 714/6 |
| 6,052,797 A | * | 4/2000 | Ofek et al. ...................... | 714/6 |
| 6,397,292 B1 | * | 5/2002 | Venkatesh et al. ........... | 711/114 |
| 2002/0049778 A1 | * | 4/2002 | Bell et al. .................... | 707/200 |
| 2002/0103900 A1 | * | 8/2002 | Cornelius et al. ............ | 709/224 |
| 2003/0074417 A1 | * | 4/2003 | Kasako et al. ............... | 709/217 |

* cited by examiner

Primary Examiner—Reba I. Elmore
(74) Attorney, Agent, or Firm—Ridout & Maybee LLP

(57) ABSTRACT

A system and method for removing distance related latency effects in acknowledged data transfer applications. The system comprises providing highly reliable redundant communication links between a primary storage site and a remote storage site. The system receives data from a storage consumer and transcribes the data to a storage device at the primary storage site. Copies of the data are placed on each of the redundant communication links for transmission to the remote storage site, and a data transfer acknowledgement is immediately generated for the storage consumer. The copies of data are reconciled at the remote storage site and the data is transcribed to a storage device. A transaction report is issued and transmitted to the primary storage site. In the rare event that there are any errors in the reconciled data at the remote storage site, the transaction report includes an error message, and subsequent error recovery procedures are undertaken.

24 Claims, 8 Drawing Sheets

SYSTEM AND METHOD FOR REMOVING LATENCY EFFECTS IN ACKNOWLEDGED DATA TRANSFERS

FIELD OF THE INVENTION

The present invention relates to data storage and transfer systems, and more particularly to a system for removing latency effects in acknowledged data transfers.

BACKGROUND OF THE INVENTION

In data storage systems, such as disk drive based systems, there is an inherent latency associated with write (and read) operations. The latency is the result of the time required for physical positioning of the write head over the appropriate area of the recording medium within the disk drive. This delay is typically in the order of 10 milliseconds and amounts to unacceptable performance degradation for many applications. One known solution to the latency delay is to provide a write cache memory for temporarily storing the write data prior to transcription to the disk drive.

Remote or mirrored storage systems are a type of storage system which find use in transactional database applications, as well as other applications. A mirrored storage system includes a primary storage site and a remote or mirrored storage site. The primary storage site receives data from a storage consumer, for example, a server or mainframe computer, and the data is transcribed by a controller to a primary storage device, for example, a disk drive. The remote storage site is coupled to the primary storage site through a communication link. The remote storage site includes a remote storage device and a controller. The controller receives a copy of the data from the primary storage site and transcribes the data to the remote storage device. The remote storage device allows the data to be restored if the primary storage site becomes inoperable.

In a conventional transactional database system, the transactions are processed sequentially. Before the storage consumer can process a second transaction, e.g. a data storage request, acknowledgement of the previous data transcription must be received, and in a mirrored storage system, this means acknowledgement from the primary storage site and also from the remote storage site. This guarantees that the data is securely stored even if either the primary or remote are destroyed.

In a remote mirrored system where the primary site and the remote site are linked by a long communication link, there can be a substantial delay for the data to be transmitted from the primary site to the remote site, and for the acknowledgement to be transmitted back to the primary site from the remote site after the data has been transcribed at the remote site. Such delay can severely degrade the performance of the entire transaction processing system. For example, if the mirrored site is 1,000 km away from the primary site, and the communication link is an uninterrupted optical fiber link, the speed of light inside the optical fiber imposes a transmission delay of approximately 5 milliseconds for transmission of the data to the remote site and an additional 5 milliseconds for the acknowledgement to be returned from the remote site, resulting in a total delay of at least 10 milliseconds. If the storage consumer, e.g. server, must wait for the acknowledgement to process subsequent transactions, then the storage consumer can process at most 100 transactions per second, which is slow by today's server performance standards. This situation is exacerbated by additional delays due to various switching equipment encountered in the communication link.

The distance between the primary storage site and the remote storage site is integral to the safety factor offered by the mirrored storage system, in that the greater the distance the more unlikely it is that an event could incapacitate or destroy both the primary storage site and the remote or mirrored storage site. Therefore, reducing the distance to the mirrored storage site is not a preferred solution to reducing the delay. Also, the use of a simple cache as discussed above does not remove the latency effect without partly defeating the security intended by a mirrored storage system.

Only in cases where high performance is paramount but where the risk of data loss can be tolerated, are caching systems used to hide latency for remote mirroring. In such configurations the controller with cache acts as a proxy to the remote mirror system and spoofs ("fakes") the acknowledgement that would normally be sent from the remote mirror. Data could be lost if the data fails to reach and be transcribed to the remote mirror while the primary site is destroyed or incapacitated.

Accordingly, there remains a need for a system which can hide the effect of latency for systems such as those having long telecommunication links where the data sender requires acknowledgement of correct transmission to the data recipient while at the same time minimizing the risk of data loss.

BRIEF SUMMARY OF THE INVENTION

The present invention provides a system and technique that allows data issued from a storage consumer to be transcribed with confirmation to both a local storage site and a remote or mirrored storage site without suffering the penalty of transmission delay on the link between the local and remote storage sites for transcription acknowledgement, while minimizing the risk of data loss between the local storage site and the remote storage site.

In a first aspect, the present invention provides a mirrored storage system for transcribing data from a storage consumer, the system comprises: (a) a primary site, and a remote site; (b) a communication link couples the primary site to the remote site; (c) the primary site receives data from the storage consumer, and the primary site includes a primary controller and a primary storage device, the controller is operative to transcribe the data received from the storage consumer to the primary storage device, and the controller is operative to transmit data to the remote site via the communication link; (d) the remote site has a remote controller and a remote storage device, and the remote controller is coupled to the communication link, and the remote controller is operative to receive data transmitted by the primary controller and transcribe the received data to the remote storage device; (e) the communication link comprises a plurality of redundant communication paths, and the primary controller is operative to transmit a copy of the data received from the storage consumer on each of the redundant communication paths.

In another aspect, the present invention provides method for transcribing data from a storage consumer in a mirrored storage system, the method comprises the steps of: providing a primary site and a secondary site, the primary site has a controller and a primary storage device, and the secondary site has a controller and a secondary storage device, and coupling the primary site and the secondary site with a communication link, the communication link is provided with a plurality of redundant communication paths; receiving data from the storage consumer at the primary site, and transcribing the received data to the primary storage device; transmitting a copy of the received data on each of the redundant communication paths to the secondary site; receiving the transmitted copies of the data at the secondary site, and transcribing the data to the secondary storage device.

In yet another aspect, the present invention provides a remote primary storage system for storing data from a storage consumer, the system comprises: (a) a primary site, and a remote site; (b) a communication link coupling the primary site to the remote site; (c) the primary site has an input coupled to the storage consumer for receiving data from the storage consumer, and the primary site includes a primary controller and a temporary storage device, the primary controller is operative to transcribe the data received from the storage consumer to the temporary storage device, and the primary controller is operative to transmit data to the remote site via the communication link; (d) the remote site has a remote controller and a storage device, and the remote controller is coupled to the communication link, and the remote controller is operative to receive data transmitted by the primary controller and transcribe the received data to the storage device; (e) the communication link comprises a plurality of redundant communication paths, and the primary controller is operative to transmit a copy of the data received from the storage consumer on each of the redundant communication paths.

In a further aspect, the present invention provides a remote backup system for storing data from a storage consumer, the remote backup system includes: (a) a primary site, and a remote site; (b) a communication link coupling the primary site to the secondary site; (c) the primary site has an input coupled to the storage consumer for receiving data from the storage consumer, and the primary site includes a primary controller and a primary storage device, the primary controller is operative to transcribe the data received from the storage consumer to the primary storage device, and the primary controller is operative to transmit data to the remote site via said communication link; (d) the remote site has a remote controller and a permanent storage device, and the remote controller is coupled to the communication link, and the remote controller is operative to receive data transmitted by the primary controller and transcribe the received data to the permanent storage device; (e) the communication link includes a plurality of redundant communication paths, and the primary controller is operative to transmit a copy of the data received from the storage consumer on each of the redundant communication paths.

In another aspect, the present invention provides a mirrored storage system for transcribing data from a storage consumer, the system comprises: (a) a primary site, a first remote site and a second remote site; (b) a first communication link coupling the primary site to the first remote site; (c) a second communication link coupling the primary site to the second remote site; (d) the primary site has an input coupled to the storage consumer for receiving data from the storage consumer, and the primary site includes a primary controller and a primary storage device, the controller is operative to transcribe the data received from the storage consumer to the primary storage device, and the controller is operative to transmit data to the first remote site via the first communication link and to the second remote site via the second communication link; (e) the first remote site includes a controller and a storage device, and the controller is coupled to the first communication link, and the controller is operative to receive data transmitted by the primary controller over the first communication link and transcribe the received data to the storage device; (f) the second remote site includes a controller and a storage device, and the controller is coupled to the second communication link, and the controller is operative to receive data transmitted by the primary controller over the communication link and transcribe the received data to the storage device; (g) the communication link includes a plurality of redundant communication paths, and the primary controller is operative to transmit a copy of the data received from the storage consumer on each of the redundant communication paths.

The present invention is particularly suited to storage data transfer for transactional systems, where each transaction transcription needs to be acknowledged before the next transaction can be processed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings, which show, by way of example, a preferred embodiment of the present invention, and in which.

DETAILED DESCRIPTION OF THE PREFERRED EMBODIMENTS

Figure 1:
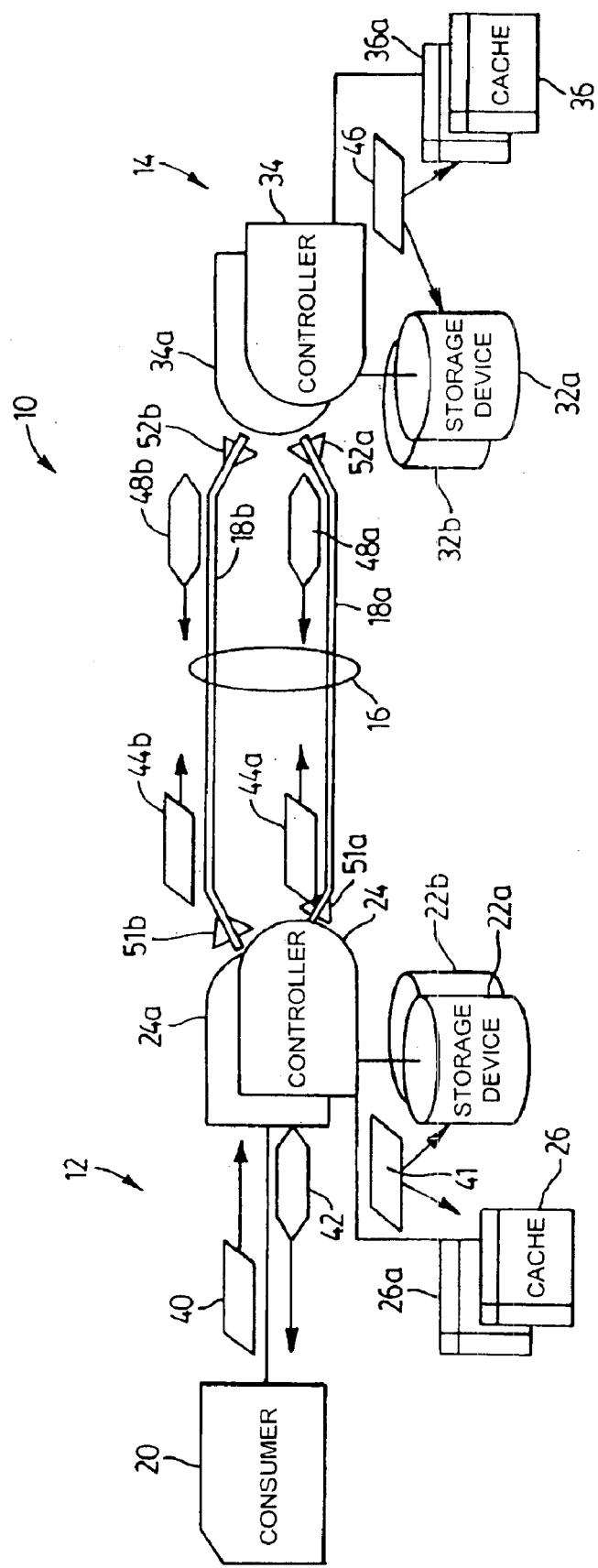
FIG. 1 is a schematic diagram of a remote mirrored storage system according to the present invention.

Reference is first made to FIG. 1 which shows in schematic form a remote mirrored storage system according to the present invention and indicated generally by reference 10. While the present invention is described in the context of a synchronous remote mirroring of storage, it will be appreciated that the system 10 has wider applicability to other systems, including remote primary storage and backup.

As shown in FIG. 1, the remote mirrored storage system 10 comprises a primary site 12 and a remote or mirror site 14. The primary 12 and remote 14 sites are linked by a communication link 16. The primary site 12 serves as the primary storage site for storing data received from a storage consumer 20. The principal purpose of the remote or mirror site 14 is to replace the primary site 12 or reload data to an alternate system (not shown) if the primary site 12 becomes inoperable. The communication link 16 comprises at least two redundant communication paths or links 18a and 18b. Each communication path or link 18 comprises terminal transmission equipment denoted by references 51a, 51b, 52a and 52b, which connect to the storage controllers (described below). Data and information are transmitted and received between the primary site 12 and the remote site 14 as will be described in more detail below.

The primary site 12 is coupled to the storage consumer 20, and includes a primary storage device 22, and a primary storage controller 24. The primary site 12 may also include a memory cache 26. The storage consumer 20 may comprise a server or a mainframe computer, and represents the user or consumer of the storage capabilities of the primary storage device 22. Similarly, the remote site 14 includes a remote storage device 32, a remote storage controller 34, and an optional memory cache 36. The storage devices 22 and 32 typically comprise a disk storage device. A data block 40, for example, a packet, a frame, a message, a file segment, etc. is sent from the storage consumer to the primary controller 24 and copies 44a, 44b of the data block are transmitted over the communication link 16 to the remote site 14, and an acknowledgement or transcription report 42 is issued to confirm correct transfer of the data block 40 as will be described in more detail below.

Figure 8:
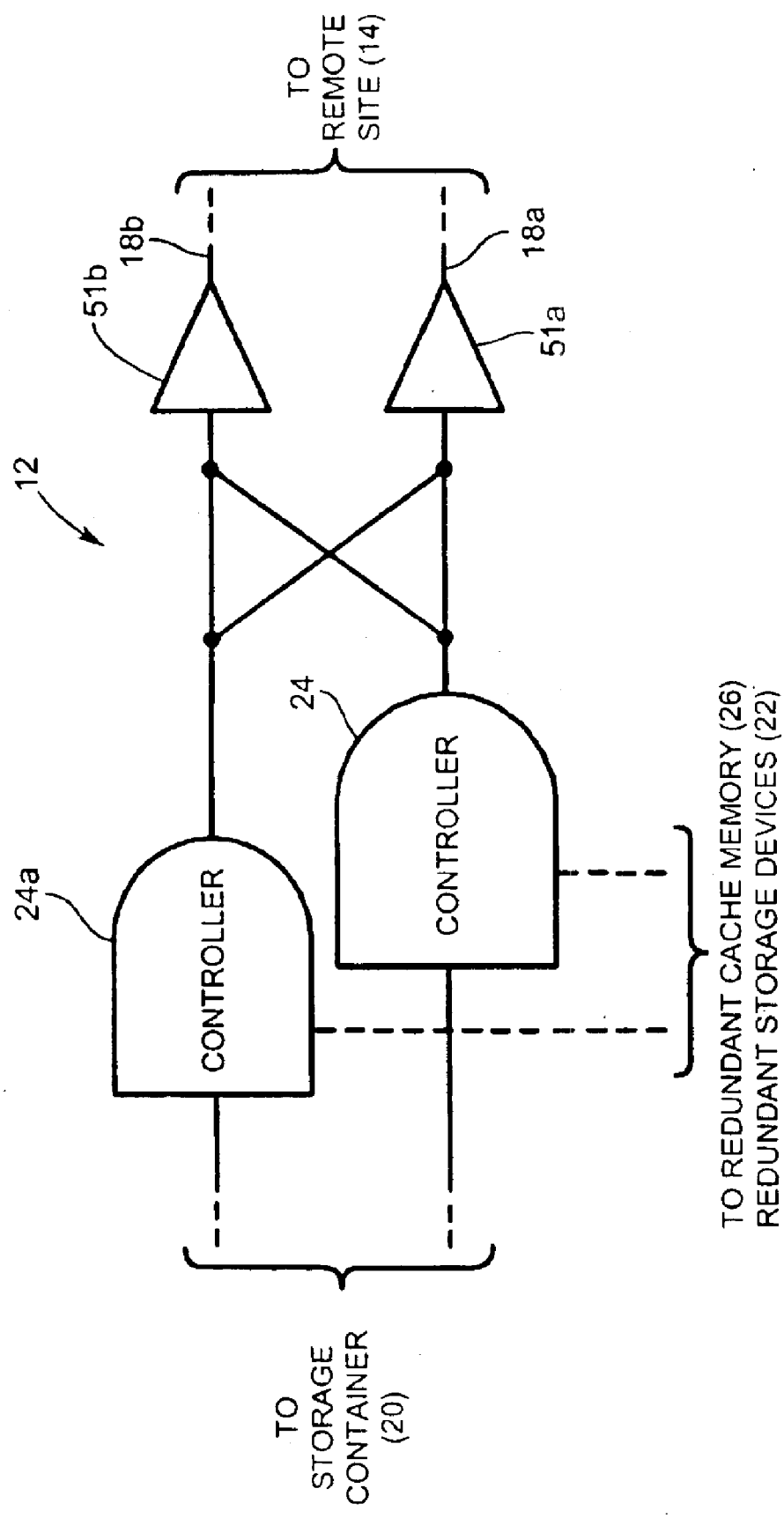
FIG. 8 is a schematic diagram of an arrangement for redundant primary storage controllers for the remote mirrored storage system of FIG. 1.

It will be appreciated that other specific configurations are possible for the primary 12 and the remote 14 sites. For example, redundant controllers 24 and/or 34, redundant cache memories 26 and/or 36, or redundant storage devices 22 (shown individually as 22a, 22b) and/or 32 (shown individually as 32a, 32b) may be provided. As shown in FIG. 8, in the case of the redundant primary storage controllers 24a and 24b, each one of the controllers 24a, 24b is coupled to both terminal transmission devices 51a and 51b. Alternative configurations are described in more detail below. It will also be appreciated that many of the functional units described herein may be implemented in a single physical device or a combination of such devices.

Figure 2I:
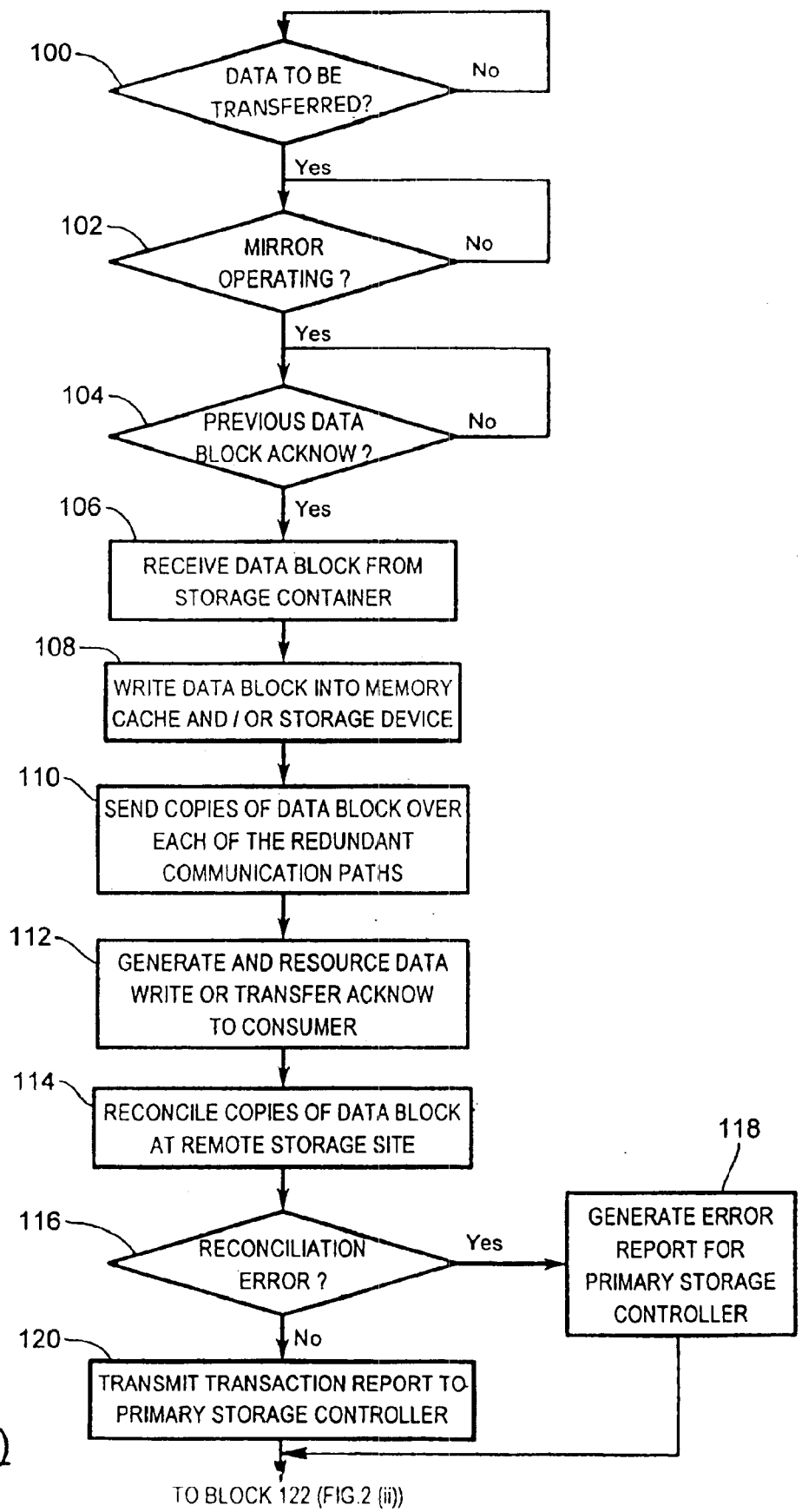
FIG. 2 is a flow chart showing the process steps for operation of the remote mirrored storage system according to the present invention.
Figure 2:
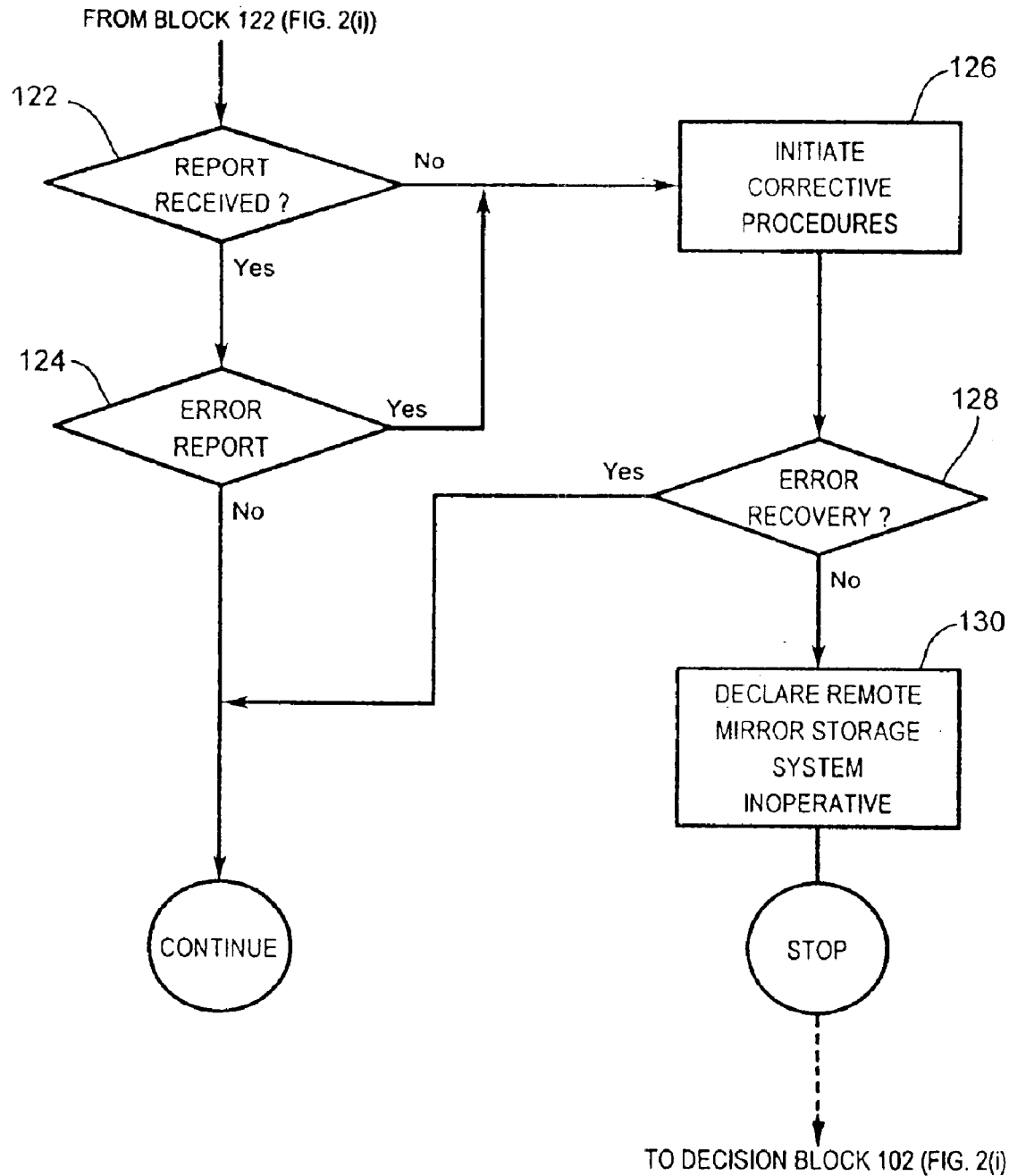

Referring next to FIG. 2 in conjunction with FIG. 1, the sequence of events for transmitting, i.e. writing, a data block 40 from a storage consumer 20 to a remotely mirrored storage system 10 comprises the following steps. If there is a data block 40 to be transcribed (decision block 101 is TRUE) and the remote mirrored storage system 10 is operational (decision block 102 is TRUE) and the previous transaction has been acknowledged (decision block 104 is TRUE), then the data block 40 is sent from the storage consumer 20 to the primary storage controller 24 as indicated by block 106. The primary storage controller 24 writes a copy 41 of the data block 40 into the memory cache 26, and then to the storage device 22 (block 108). Alternatively, the copy 41 of the data block 40 may be written by the primary storage controller 24 directly to the primary storage device 22. The next operation involves sending one copy (indicated by reference 44a in FIG. 1) of the data block 40 over the redundant communication path 18a and another copy (indicated by reference 44b in FIG. 1) of the data block 40b over the other redundant communication path 18b (block 110). Once the data block 40 is successfully written to local storage (i.e. the memory cache 26 and/or the storage device 22) in the primary site 12, and the entire data block 40 has been placed on the redundant communication paths 18 in the link 16, the primary storage controller 24 generates a data write or transfer acknowledgement 42 (FIG. 1) which is sent to the storage consumer 20 as indicated by block 112. This completes the latency cycle perceived by the storage consumer 20. After receiving all copies 44 (FIG. 1) of the data block 40 transmitted over the redundant communication paths 18, the remote storage controller 34 at the remote or mirrored site 14 reconciles the multiple copies 44 (FIG. 1) of data block 40 and writes the data block 40 to the memory cache 36 and/or the remote storage device 32 (block 114). If there are no errors in the reconciliation of the data block 40 at the remote site 14 (decision block 116 is FALSE), the remote storage controller 34 sends a transaction report 48 confirming the data transcription to the primary storage controller 24 (block 120). As shown in FIG. 1, individual transaction reports 48a and 48b may transmitted on each of the redundant communication paths 18a and 18b. If there is a failure in reconciliation of the data block 40 or transcription of the data block 40 by the remote storage controller 34, then the individual transaction reports 48 will comprise an error report or message (block 118) which is transmitted to the primary storage controller 24. The primary storage controller 24 waits for a preset time (i.e. as defined by a time-out parameter) after the data block 40 was transmitted to the remote site 14 to receive the transaction report 48 confirming receipt of the data block by the remote storage controller 34 or an error report for that data block 40 (decision block 122). If the primary storage controller 24 does not receive the transaction report 48 within the preset time limit or the transaction report 48 comprises an error report (decision block 124 is TRUE), then the controller 24 initiates corrective procedures (block 126).

At the remote site 14, the remote storage controller 34 performs a number of reconciliation procedures. The reconciliation procedures include eliminating any received data blocks 44 which contains faults. This procedure involves normal error detection and correction methods. The reconciliation procedures include individually comparing the successfully received copies 44a and 44b of the data block 40 and declaring a fault if there is any discrepancy between the received data 44a and 44b. Optionally, the remote storage controller 24 could select (e.g. vote) the correct received data block 44 if there are an odd number of redundant communication links 18, for example, three or more links 18. In the rare case where an error condition prevents the correct reconciliation or transcription of the received data blocks 44 at the remote site 14, then the remote storage controller 34 generates a transaction error report 48 and sends it to the primary storage controller 24.

If the transcription report 48 is not received by the primary storage controller 24 from the remote storage controller 34 within the predetermined time period (block 122 in FIG. 2), or if remote storage controller 34 sends an error report (block 118 in FIG. 2), then the primary storage controller 24 operates on the basis that a dramatic fault has occurred and the mirror operation of the system 10 is in jeopardy. Under a dramatic fault condition, the primary storage controller 24 is preferably configured to perform various corrective procedures (block 126 in FIG. 2). The corrective procedures include a handshaking procedure with the remote storage controller 34 to verify correct data transmission on all of the redundant communication links 18a and 18b. If the handshaking procedure is successful, then the data block 40 that resulted in the error is retransmitted by the primary storage controller 24 to the remote storage controller 34. If the handshaking procedure fails or there are repeated error reports generated by the remote storage controller 34, then the primary storage controller 24 declares the remote mirrored storage system 10 to be inoperable (block 130 in FIG. 2), and preferably the primary storage controller 24 refuses further transcription requests from the storage consumer 20 (e.g. mainframe computer or server).

It will be appreciated that once the remote mirrored storage system 10 has been declared inoperative the cause of the fault must be located and repaired. The primary storage site 12 and the remote storage site 14 are then re-synchronized and the operation of the remote mirrored storage system 10 as described above is restored.

The remote mirrored storage system 10 according to the present invention is applicable to different types of networking technologies such as, but not limited to, SONET, ATM, IP, Ethernet and Fiber Channel. Networking technologies, such as SONET, are particularly suited for the redundant communication links 18, as it provides a highly reliable communication pathway with sufficient robustness and redundancy to assure transmission. It is noted that current Internet Protocol (IP) networks with their rate of packet loss do not have the required delivery reliability and are therefore generally not favoured for the redundant communication links 18. It is to be appreciated that because the effect of latency is virtually eliminated by the remote mirrored storage system 10 as described above, the redundant communication links 18 can be configured for virtually any distance, bandwidth or delay which may be encountered on the communication links 18.

For a SONET-based communication circuit, the Bit Error Rate (BER) is in the order of $10^{-12}$. With a data rate of 1 Gbps ($10^9$), statistically one transmission error would occur every 1000 seconds or about every 20 minutes. A conventional transactional system would not be considered reliable if one transaction every 20 minutes was faultily transmitted. In conventional mirroring systems acknowledgement form the remote or mirror storage site is required so that the controller at the primary storage site has the opportunity to resend the data block when these random errors occur.

In the context of the present invention, the redundant communication links 18 for the remote mirrored storage system 10 allow the remote storage controller 34 to ignore a copy 44 of the data block 40 from redundant communication link 18 with an error and use only the copy 44 (or copies) of the data block 40 from the remaining redundant communication links 18. It will be appreciated that in the highly unlikely event that an error occurs simultaneously on all of the redundant communication links 18, recovery of the data block 40 is not possible without retransmission. Assuming a data block size of $10^6$ bits (large for most of today's transactional systems), it has been determined that the likely occurrence of simultaneous corruption of data blocks on two redundant communication links 18 with a BER of $10^{-12}$ is one every $10^9$ seconds, or approximately every 32 years. This is sufficiently longer than the lifetime of most transactional processing systems and as such may be considered insignificant. But even then, if such a fault should occur, the remote mirrored storage system 10 according to the present invention includes a mechanism for retransmission of the faulty data as described above.

Another aspect of link reliability is called availability and is the fraction of time that a link is expected to function properly. For example, availability of 0.99999 or $1-10^{-5}$ means that the link is expected to be unavailable because of failure, maintenance, accident, etc. only 0.00001 (or 0.001%) of the time. This corresponds to about 5 minutes per year.

In the context of the present invention, having independent redundant communication paths 18a and 18b, each with an availability of $1-10^{-5}$ translates to an availability of combined data link 16 of about $1-10^{-10}$ or five minutes in one hundred thousand years. Again, this probability is insignificant for most practical applications.

For applications where a higher safety factor is desired, or where the availability of the redundant communication link 18 is lower than $1-10^{-5}$ or the BER is lower than $10^{-12}$, the number of redundant communication links 18 may be increased beyond the two described above in order to provide increased reliability.

In addition to errors that may occur on the redundant communication links 18, malfunctions are also possible in the primary 24 and the remote 34 storage controllers, the primary 26 and the remote 36 memory caches, and the primary 22 and the remote 32 storage devices. To reduce the risk of data loss, redundancy can be provided for these components. As shown in FIG. 1, redundant primary 24a and remote 34a storage controllers may be provided. Similarly, redundant primary 26a and remote 36a memory caches may be provided.

In order to detect and recover from potential corruption of data on the storage devices after transcription, the primary storage controller 24 and the remote or mirrored storage controller 34, preferably, verify their synchronization on a scheduled basis. The verification procedures may include the use of CRC checks or other suitable error detection mechanisms. If a discrepancy is found between the content of the primary storage 22 and the remote storage 32, the content of the primary storage device 22 may be resent to the remote storage device 32. It will be appreciated that during the synchronization process the mirror function, i.e. writing data blocks 40 from the storage consumer 20 to the remote storage device 22, should be suspended, or cached to an alternate device, to ensure exact replication on both sites.

To afford maximum data protection for the remote mirrored storage system 10 according to the present invention, the redundant communication link 16 comprises redundant communication links 18a and 18b which are independent of each other so that a failure in one of the communication links 18 is independent and unrelated to the other communication path. The independence between the redundant communication links 18a and 18b is achieved by ensuring that there are no or minimal common components, such as terminal transmission equipment 51, 52 (FIG. 1), optical fibers, switches, power supplies and physical conduits. Furthermore, each of the redundant communication links 18 is preferably individually protected to provide a required availability level, for example, 0.99999. This requires that the individual communication links 18 have spares and automatic fallback circuitry in case of failure. For maximum protection none of the spares or automatic fallback circuitry should be shared between redundant communication links 18, for example, each of the terminal transmission devices 51a and 51b may be connected to the remote counterpart terminal transmission device 52a and 52b using two optical cables (i.e. four in all) so that if one cable is cut, the terminal transmission devices 51, 52 can resume communication over the other optical cable.

Figure 3:
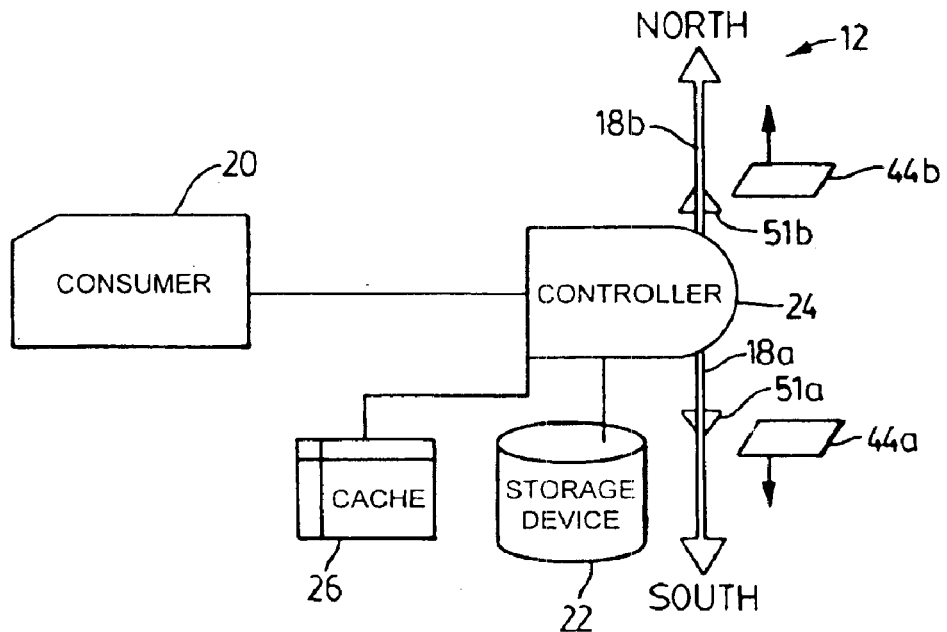
FIG. 3 is a schematic diagram of an arrangement for separating the redundant communication links for the remote mirrored storage system of FIG. 1.

Reference is next made to FIG. 3, which shows in schematic form a preferred physical configuration for the primary site 12. Since the redundant communication links 18a, 18b are coupled to the storage controller 24, there will be a physical proximity between the links 18a, 18b as the occupy the same physical space. To minimize the likelihood of the redundant links 18a, 18b being simultaneously destroyed at the coupling point to the primary controller 24 (or the remote controller 34), the redundant links 18a, 18b are preferably arranged to exit the primary storage controller 24 (and the remote storage controller 34) in opposite "North-South" directions as shown in FIG. 3. The redundant links 18a, 18b may be configured in other opposing directions, such as "East-West" (not shown). These configurations for the redundant links 18a, 18b protect the remote mirrored storage system 10 from "rolling disasters", that is an event that causes progressive destruction of one facility and then another in such a way to interrupt transmission and primary storage in sequence so that data is lost.

Figure 4:
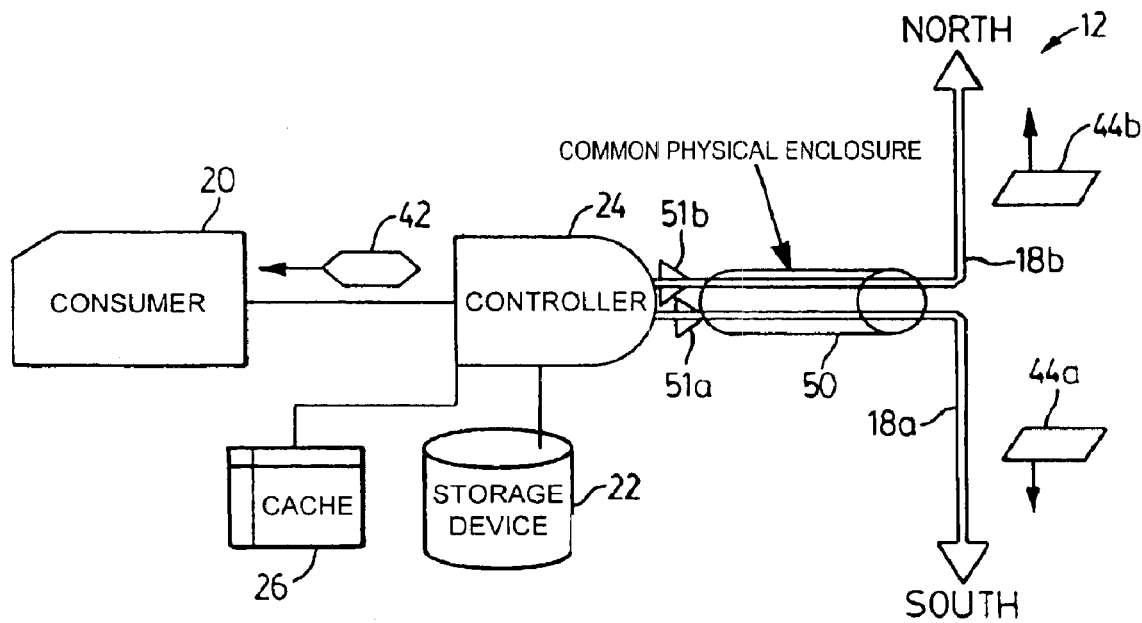
FIG. 4 is a schematic diagram of an arrangement for separating redundant communications links in a common conduit for the remote mirrored storage system of FIG. 1.

In some applications, there may be a necessity that the redundant communication links 18a, 18b share a common physical enclosure or conduit. As shown in FIG. 4, the redundant links 18a, 18b are located in a common enclosure or conduit 50 for some distance from the primary storage controller 24. In such a configuration, the redundant links 18a, 18b are arranged in a "North-South" orientation after the conduit 50, and preferably the primary storage controller 24 is programmed to a period of time equivalent to the time required for the copies 44 of the data block to traverse the conduit 50 before sending the acknowledgement 42 to the storage consumer 20, i.e. the server. This arrangement serves to protect against rolling disasters.

Reference is made back to FIG. 1. If the arrival rate of the data blocks 44 at the remote site 14 exceed the transcription rate of the remote storage controller 34 and the storage device 32 and/or the memory cache 36, then remote site 14 becomes effectively unavailable and data may be lost. An arrangement to alleviate this potential problem involves providing redundant primary 24a and secondary 34a storage controllers, redundant memory caches 26a, 36a, and redundant storage devices (not shown) at the primary 12 and the remote 14 sites. In addition, operational constraints may be placed on the remote site 14 to limit operations to transcribing data only, i.e. no reading or other access to the data in the storage device 32 is provided. If the primary 12 and remote 14 storage sites include identical controllers, storage devices and caches, then the remote or mirrored site 14 has the same capacity and lower load than the primary site 12, so that a successful transcription of the data block 41 at the primary site 12 essentially guaranties successful transcription of the data block 44 at the remote site 14.

Another reason not to allow reading of data from the storage device 32 at the remote site 14 is that the states of the primary site 12 and the mirrored site 14 might be inconsistent when the data blocks 44 are in flight or during synchronization of the primary 24 and the secondary 34 storage controllers. A data system accessing both the primary site 12 and the remote site 14 might therefore encounter errors. It will be appreciated that the principal purpose of the remote site 14 is to replace or reload the data block 40 originally transcribed by the storage consumer 20 to an alternate system should the primary site 12 become inoperable.

Figure 5:
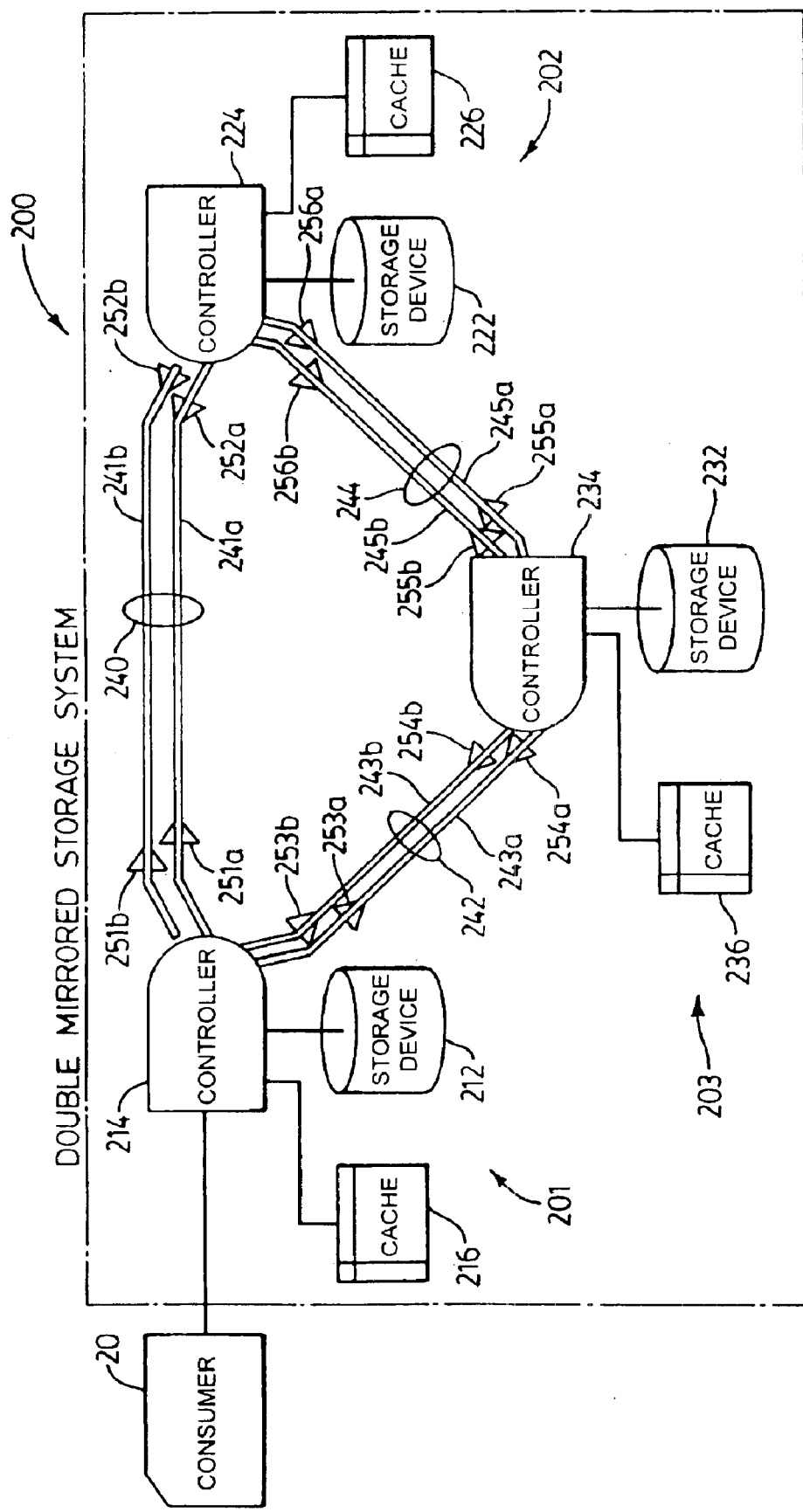
FIG. 5 is a schematic diagram of a double remote mirrored storage system according to another aspect of the present invention.

Reference is next made to FIG. 5, which shows a double remote mirrored storage system according to another aspect of the present invention and indicated generally by reference 200. The double remote mirrored storage system 200 comprises a primary site 201 and two remote sites 202 and 203 which are coupled in a ring topology as shown in FIG. 4. The primary site 201 and the remote sites 202, 203 are very similar to the remote mirrored storage system 10 described above.

As shown in FIG. 5, the primary site 201 is coupled to the storage consumer 20, and includes a primary storage device 212, and a primary storage controller 214. The primary site 201 may also include a memory cache 216. As described above, the storage consumer 20 may comprise a server or a mainframe computer. The first remote site 202 includes a remote storage device 222, a remote storage controller 224, and a memory cache 226. Similarly, the second remote site 203 includes a remote storage device 232, a remote storage controller 234, and a memory cache 236. The storage devices 212, 222 and 232 may comprise disk storage devices.

Referring to FIG. 5, the primary site 201 and the first remote site 202 are coupled by a redundant communication link 240 comprising first 241a and second 241b communication links or paths. The primary site 201 is also coupled to the second remote site 202 through another redundant communication link 242 comprises first 243a and second 243b communication links or paths. The first remote site 202 is coupled to the second remote site 203 through another redundant communication link 244 comprising first 245a and second 245b communication links or paths.

For the double remote mirrored storage system 200, the operation of the primary site 201 and the two remote sites 202 and 203 is essentially the same as for remote mirrored storage system 100 described above with reference to FIGS. 1 and 2, with the notable exception that the three storage controllers 214, 224, 234 must maintain synchronization.

For the double remote mirrored storage system 200 shown in FIG. 5, it is possible to eliminate the ring topology, i.e. the communication link 244 between the first remote site 202 and the second remote site 203 may be removed. In most cases the redundant communication links 241a, 241b and 243a, 243b provide sufficient redundancy. According to another aspect, because of the redundancy provided by the ring topology, it is possible to replace the redundant communication links 240, 242 and 244 with single communication paths or links.

Figure 6:
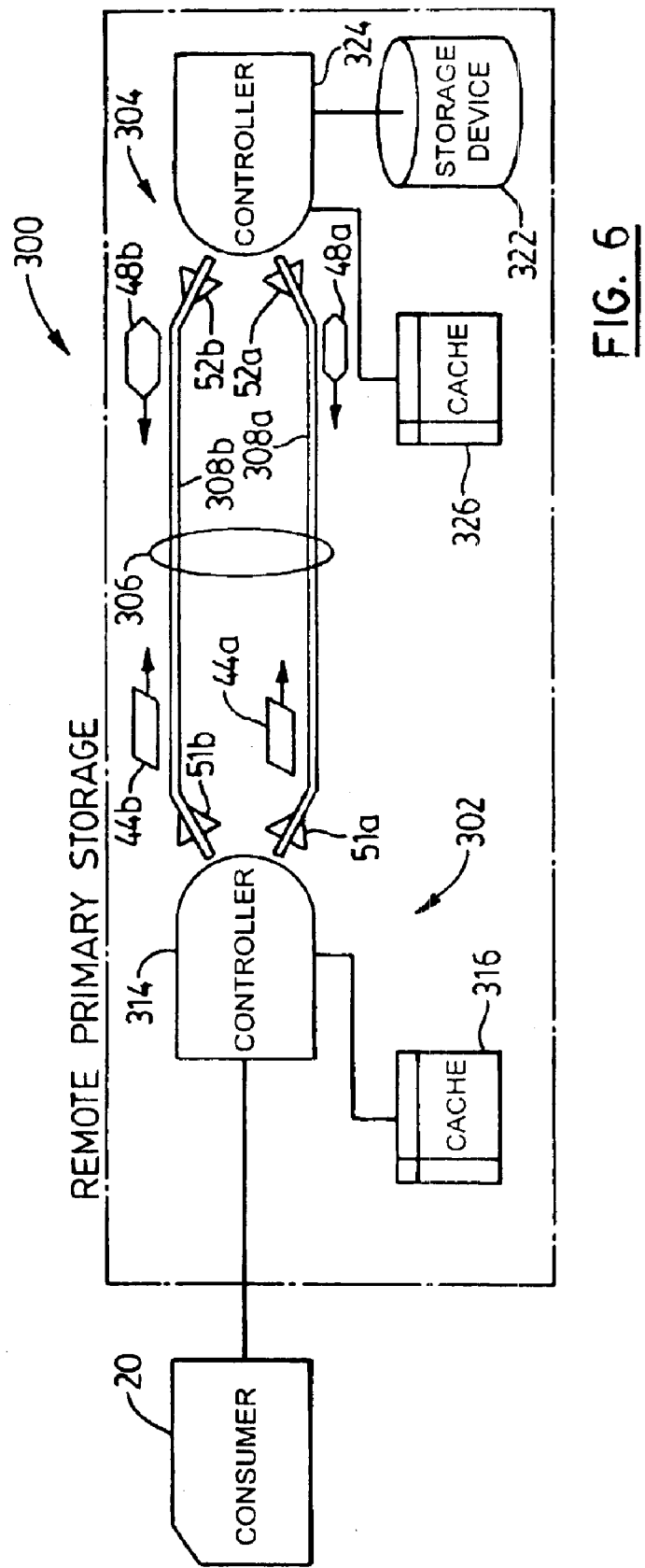
FIG. 6 is a schematic diagram of a remote primary storage system according to another aspect of the present invention.

Reference is next made to FIG. 6 which shows a remote primary storage system 300 according to another aspect of the present invention. The remote primary storage system 300 comprises a primary site 302 and a remote site 304. The primary site 302 is coupled to the storage consumer 20 and includes a primary controller 314 and a memory cache 316 only, without a primary storage device. The remote site 304 is coupled to the primary site 302 through a redundant communication path 306 comprising first 308a and second 308b redundant communications links. The remote site 304 as shown in FIG. 6 comprises a remote storage device 322, a remote storage controller 324, and a memory cache 326.

For the remote primary storage system 300, the primary site 302, the primary site 302 does not provide any permanent storage capability, and permanent storage is provided by the storage device 322 at the remote site 304. In this arrangement, the remote site 304 serves as a remote data center. The memory cache 316 at the primary site 302 is provided as temporary storage for outgoing data blocks 44 while the primary controller 314 waits for a transcription confirmation 48 from the remote storage controller 324. The memory cache 316 at the primary site 302 is also available to store information for read operations. All other functions are as described above.

Figure 7:
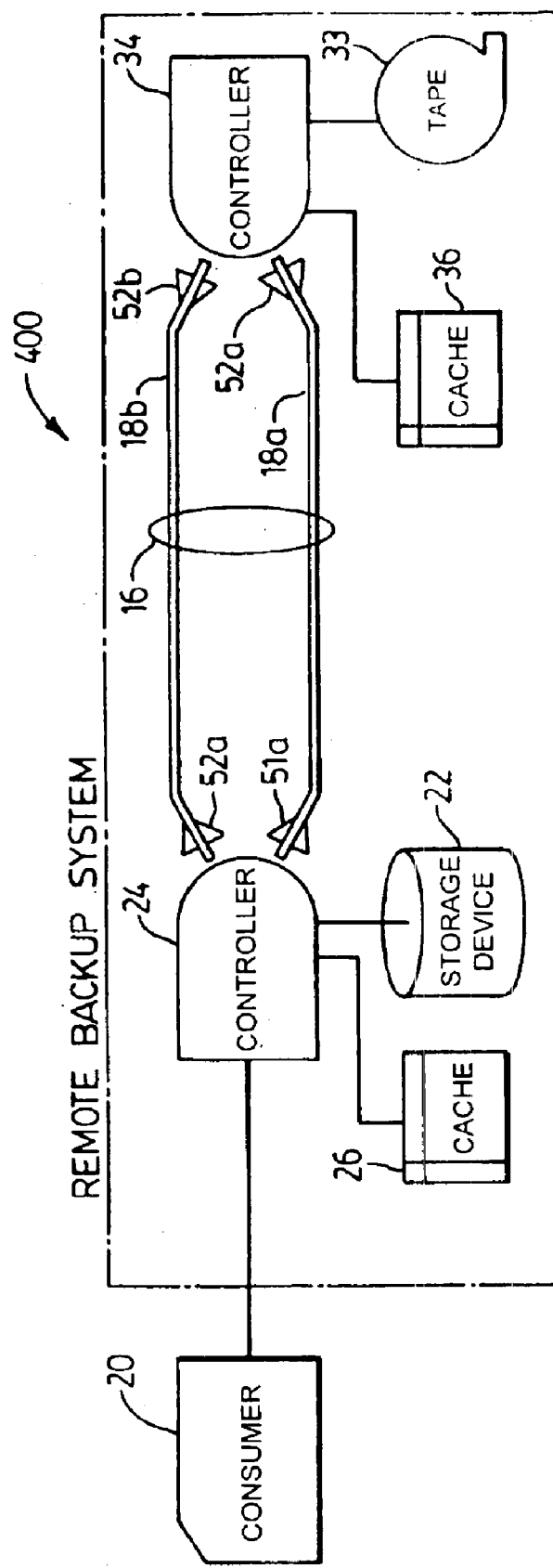
FIG. 7 is a schematic diagram of a remote backup system according to another aspect of the present invention.

Reference is next made to FIG. 7, which shows a remote backup system 400 according to another aspect of the invention. The remote backup system 400 has virtually the same configuration as the remote mirrored storage system 10 (FIG. 1), except that the remote storage device 32 is replaced by a tape backup device 33 as shown in FIG. 7, instead of a disk drive used in mirroring applications.

It will be appreciated that the invention as described above effectively provides all the security and other benefits of remote storage or remote mirrored storage, without the customary performance penalties due to latency. This is made possible mainly through the use of highly reliable redundant links which for all practical purposes eliminate the possibility of transmission loss or error. In the rare event that an error does occur, robust recovery procedures are provided such that complete loss of an acknowledged data transfer from a storage consumer is all but impossible barring simultaneous destruction of both primary and remote sites.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A mirrored storage system for transcribing data from a storage consumer, said system comprising:

(a) a primary site, and a remote site;
   (b) a communication link coupling said primary site to said remote site;
   (c) said primary site having an input coupled to the storage consumer for receiving data from the storage consumer, and said primary site including a primary controller and a primary storage device, said controller being operable for transcribing the data received from the storage consumer to said primary storage device, and said controller being operable for transmitting data to said remote site via said communication link;
   (d) said remote site having a remote controller and a remote storage device, and said remote controller being coupled to said communication link, and said remote controller being operable for receiving data transmitted by said primary controller and transcribing said received data to said remote storage device;
   (e) said communication link comprising a plurality of redundant communication paths, and said primary controller being operable to transmit a copy of the data received from the storage consumer on each of said redundant communication paths.

2. The mirrored storage system as claimed in claim 1, wherein said primary controller is operable to generate a data transfer acknowledgement for the storage consumer after transcribing the received data to said primary storage device.

3. The mirrored storage system as claimed in claim 2, wherein said remote controller is operable to generate a transaction report for said primary controller after receiving the data transmitted by said primary controller.

4. The mirrored storage system as claimed in claim 3, wherein said primary site includes a temporary storage device, said primary controller being operable to transcribe the data received from the storage consumer to said temporary storage device.

5. The mirrored storage system as claimed in claim 3, wherein said storage device comprises a permanent storage device.

6. The mirrored storage system as claimed in claim 1, wherein said remote controller is operable to reconcile said copies of data transmitted by said primary controller and detect errors in any of said copies of data, and in response to a detected error issue an error message for said primary controller.

7. The mirrored storage system as claimed in claim 6, wherein said primary controller is operable to retransmit the data to said remote site in response to said error message.

8. The mirrored storage system as claimed in claim 6, wherein said primary controller is operable to generate a data transfer acknowledgement for the storage consumer after transcribing the received data to said primary storage device.

9. The mirrored storage system as claimed in claim 1, wherein said communication link comprises a first communication path and a second communication path, said first and second communication paths being independent of each other.

10. The mirrored storage system as claimed in claim 9, wherein said first communication path is oriented in direction opposite to said second communication path.

11. A method for transcribing data from a storage consumer in a mirrored storage system, said method comprising the steps of:

providing a primary site and a secondary site, said primary site having a controller and a primary storage device, and said secondary site having a controller and a secondary storage device, and coupling said primary site and said secondary site with a communication link, said communication link being provided with a plurality of redundant communication paths;
   receiving data from the storage consumer at said primary site, and transcribing the received data to said primary storage device;
   transmitting a copy of said received data on each of said redundant communication paths to said secondary site;
   receiving the transmitted copies of the data at said secondary site, and transcribing the data to said secondary storage device.

12. The method as claimed in claim 11, further including the step of generating a data transfer acknowledgement for the storage consumer after transcribing the received data to said primary storage device.

13. The method as claimed in claim 12, wherein said step of receiving the transmitted copies of the data at said secondary site includes reconciling the copies of the data and issuing an error report for the controller at said primary site if an error is detected in the data.

14. The method as claimed in claim 12, further including the step of generating a transaction report for the controller at said primary site after receiving the data at said secondary site.

15. The method as claimed in claim 14, wherein said step of receiving the transmitted copies of the data at said secondary site includes reconciling the copies of the data and issuing an error message in said transaction report if an error is detected in the data.

16. The method as claimed in claim 15, further including the step of retransmitting the data from the primary site in response to a transaction report having an error message.

17. The method as claimed in claim 13, wherein said step of reconciling includes checking each of said copies of data for errors and voting for the copy of data to be transcribed to said secondary storage device.

18. A remote primary storage system for storing data from a storage consumer, said system comprising:

(a) a primary site, and a remote site;
   (b) a communication link coupling said primary site to said secondary site;
   (c) said primary site having an input coupled to the storage consumer for receiving data from the storage consumer, and said primary site including a primary controller and a temporary storage device, said primary controller being operable for transcribing the data received from the storage consumer to said temporary storage device, and said primary controller being operable for transmitting data to said remote site via said communication link;

(d) said remote site having a remote controller and a storage device, and said remote controller being coupled to said communication link, and said remote controller being operable for receiving data transmitted by said primary controller and transcribing said received data to said storage device;

(e) said communication link comprising a plurality of redundant communication paths, and said primary controller being operable to transmit a copy of the data received from the storage consumer on each of said redundant communication paths.

19. The remote primary storage system as claimed in claim 18, wherein said primary controller is operable to generate a data transfer acknowledgement for the storage consumer after transcribing the received data to said primary storage device.

20. The remote primary storage system as claimed in claim 19, wherein said secondary controller is operable to generate a transaction report for said primary storage controller after receiving the data transmitted by said primary controller.

21. The remote primary storage system as claimed in claim 20, wherein said primary site includes a temporary storage device, said primary controller being operable to transcribe the data received from the storage consumer to said temporary storage device.

22. A multiple mirrored storage system for transcribing data from a storage consumer, said system comprising:

(a) a primary site, a first remote site and a second remote site;

(b) a first communication link coupling said primary site to said first remote site;

(c) a second communication link coupling said primary site to said second remote site;

(d) said primary site having an input coupled to the storage consumer for receiving data from the storage consumer, and said primary site including a primary controller and a primary storage device, said controller being operable for transcribing the data received from the storage consumer to said primary storage device, and said controller being operable for transmitting data to said first remote site via said first communication link and to said second remote site via said second communication link;

(e) said first remote site having a controller and a storage device, and said controller being coupled to said first communication link, and said controller being operable for receiving data transmitted by said primary controller over said first communication link and transcribing said received data to said storage device;

(f) said second remote site having a controller and a storage device, and said controller being coupled to said second communication link, and said controller being operable for receiving data transmitted by said primary controller over said communication link and transcribing said received data to said storage device;

(g) said communication links comprising a plurality of redundant communication paths, and said primary controller being operable to transmit a copy of the data received from the storage consumer on each of said redundant communication paths.

23. The mirrored storage system as claimed in claim 22, wherein said primary controller is operable to generate a data transfer acknowledgement for the storage consumer after transcribing the received data to said primary storage device.

24. The mirrored storage system as claimed in claim 23, wherein the controllers at said first remote site and said second secondary controller are operable to generate a transaction report for said primary storage controller after receiving the data transmitted by said primary controller.

* * * * *